(12) United States Patent
Michalske

(10) Patent No.: US 10,772,394 B1
(45) Date of Patent: Sep. 15, 2020

(54) TACTILE OUTPUT FOR WEARABLE DEVICE

(71) Applicant: Apple Inc., Cupertino, CA (US)

(72) Inventor: Steven C. Michalske, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 161 days.

(21) Appl. No.: 15/253,817

(22) Filed: Aug. 31, 2016

Related U.S. Application Data

(60) Provisional application No. 62/305,245, filed on Mar. 8, 2016.

(51) Int. Cl.
  *A44C 5/14* (2006.01)

(52) U.S. Cl.
  CPC .................................. *A44C 5/14* (2013.01)

(58) Field of Classification Search
  CPC .... G09B 21/00; G09B 21/001; G09B 21/003; G09B 21/004; A44C 5/14
  See application file for complete search history.

(56) References Cited

U.S. PATENT DOCUMENTS

| | | | |
|---|---|---|---|
| 5,196,745 A | 3/1993 | Trumper et al. | |
| 5,293,161 A | 3/1994 | MacDonald et al. | |
| 5,424,756 A | 6/1995 | Ho et al. | |
| 5,434,549 A | 7/1995 | Hirabayashi et al. | |
| 5,436,622 A | 7/1995 | Gutman et al. | |
| 5,739,759 A | 4/1998 | Nakazawa et al. | |
| 6,084,319 A | 7/2000 | Kamata et al. | |
| 6,342,880 B2 | 1/2002 | Rosenberg et al. | |
| 6,373,465 B2 | 4/2002 | Jolly et al. | |
| 6,438,393 B1 | 8/2002 | Surronen | |
| 6,445,093 B1 | 9/2002 | Binnard | |
| 6,493,612 B1 | 12/2002 | Bisset et al. | |
| 6,693,622 B1 | 2/2004 | Shahoian et al. | |
| 6,822,635 B2 | 11/2004 | Shahoian | |
| 6,864,877 B2 | 3/2005 | Braun et al. | |
| 6,952,203 B2 | 10/2005 | Banerjee et al. | |
| 6,988,414 B2 | 1/2006 | Ruhrig et al. | |
| 7,068,168 B2 | 6/2006 | Girshovich et al. | |
| 7,080,271 B2 | 7/2006 | Kardach et al. | |
| 7,130,664 B1 | 10/2006 | Williams | |

(Continued)

FOREIGN PATENT DOCUMENTS

| | | |
|---|---|---|
| CN | 101036105 | 9/2007 |
| CN | 101409164 | 4/2009 |

(Continued)

OTHER PUBLICATIONS

Nasser et al., "Preliminary Evaluation of a Shape-Memory Alloy Tactile Feedback Display," Advances in Robotics, Mechantronics, and Haptic Interfaces, ASME, DSC-vol. 49, pp. 73-80, 1993.

(Continued)

*Primary Examiner* — Thomas J Hong

(74) *Attorney, Agent, or Firm* — Morgan, Lewis & Bockius LLP

(57) ABSTRACT

A wearable item, such as an electronic device, is disclosed. The wearable item includes a flexible strap and actuators within the flexible strap. The actuators are configured to dynamically form protrusions along the flexible strap. The protrusions present tactilely-perceptible information, such as braille characters or other symbols.

17 Claims, 11 Drawing Sheets

(56) References Cited

U.S. PATENT DOCUMENTS

| | | |
|---|---|---|
| 7,234,379 B2 | 6/2007 | Claesson et al. |
| 7,253,350 B2 | 8/2007 | Noro et al. |
| 7,323,959 B2 | 1/2008 | Naka et al. |
| 7,339,572 B2 | 3/2008 | Schena |
| 7,355,305 B2 | 4/2008 | Nakamura et al. |
| 7,370,289 B1 | 5/2008 | Ebert et al. |
| 7,392,066 B2 | 6/2008 | Hapamas |
| 7,423,631 B2 | 9/2008 | Shahoian et al. |
| 7,508,382 B2 | 3/2009 | Denoue et al. |
| 7,570,254 B2 | 8/2009 | Suzuki et al. |
| 7,656,388 B2 | 2/2010 | Schena et al. |
| 7,667,691 B2 | 2/2010 | Boss et al. |
| 7,675,414 B2 | 3/2010 | Ray |
| 7,710,397 B2 | 5/2010 | Krah et al. |
| 7,710,399 B2 | 5/2010 | Bruneau et al. |
| 7,741,938 B2 | 6/2010 | Kramlich |
| 7,755,605 B2 | 7/2010 | Daniel et al. |
| 7,798,982 B2 | 9/2010 | Zets et al. |
| 7,825,903 B2 | 11/2010 | Anastas et al. |
| 7,855,657 B2 | 12/2010 | Doemens et al. |
| 7,890,863 B2 | 2/2011 | Grant et al. |
| 7,893,922 B2 | 2/2011 | Klinghult et al. |
| 7,904,210 B2 | 3/2011 | Pfau et al. |
| 7,919,945 B2 | 4/2011 | Houston et al. |
| 7,952,261 B2 | 5/2011 | Lipton et al. |
| 7,952,566 B2 | 5/2011 | Poupyrev et al. |
| 7,956,770 B2 | 6/2011 | Klinghult et al. |
| 7,976,230 B2 | 7/2011 | Ryynanen et al. |
| 8,002,089 B2 | 8/2011 | Jasso et al. |
| 8,040,224 B2 | 10/2011 | Hwang |
| 8,053,688 B2 | 11/2011 | Conzola et al. |
| 8,063,892 B2 | 11/2011 | Shahoian |
| 8,081,156 B2 | 12/2011 | Ruettiger |
| 8,125,453 B2 | 2/2012 | Shahoian et al. |
| 8,154,537 B2 | 4/2012 | Olien et al. |
| 8,174,495 B2 | 5/2012 | Takashima et al. |
| 8,169,402 B2 | 6/2012 | Shahoian et al. |
| 8,217,892 B2 | 7/2012 | Meadors |
| 8,232,494 B2 | 7/2012 | Purcocks |
| 8,248,386 B2 | 8/2012 | Harrison |
| 8,253,686 B2 | 8/2012 | Kyung |
| 8,262,480 B2 | 9/2012 | Cohen et al. |
| 8,265,292 B2 | 9/2012 | Leichter |
| 8,265,308 B2 | 9/2012 | Gitzinger et al. |
| 8,344,834 B2 | 1/2013 | Niiyama |
| 8,345,025 B2 | 1/2013 | Seibert et al. |
| 8,351,104 B2 | 1/2013 | Zaifrani et al. |
| 8,378,797 B2 | 2/2013 | Pance et al. |
| 8,378,965 B2 | 2/2013 | Gregorio et al. |
| 8,384,316 B2 | 2/2013 | Houston et al. |
| 8,390,218 B2 | 3/2013 | Houston et al. |
| 8,390,594 B2 | 3/2013 | Modarres et al. |
| 8,400,027 B2 | 3/2013 | Dong et al. |
| 8,469,806 B2 | 6/2013 | Grant et al. |
| 8,471,690 B2 | 6/2013 | Hennig et al. |
| 8,493,177 B2 | 7/2013 | Flaherty et al. |
| 8,493,189 B2 | 7/2013 | Suzuki |
| 8,598,750 B2 | 12/2013 | Park |
| 8,598,972 B2 | 12/2013 | Cho et al. |
| 8,605,141 B2 | 12/2013 | Dialameh et al. |
| 8,614,431 B2 | 12/2013 | Huppi et al. |
| 8,619,031 B2 | 12/2013 | Hayward |
| 8,624,448 B2 | 1/2014 | Kaiser et al. |
| 8,633,916 B2 | 1/2014 | Bernstein et al. |
| 8,639,485 B2 | 1/2014 | Connacher et al. |
| 8,648,829 B2 | 2/2014 | Shahoian et al. |
| 8,681,130 B2 | 3/2014 | Adhikari |
| 8,717,151 B2 | 5/2014 | Forutanpour et al. |
| 8,730,182 B2 | 5/2014 | Modarres et al. |
| 8,749,495 B2 | 6/2014 | Grant et al. |
| 8,754,759 B2 | 6/2014 | Fadell et al. |
| 8,760,037 B2 | 6/2014 | Eshed et al. |
| 8,773,247 B2 | 7/2014 | Ullrich |
| 8,797,153 B2 | 8/2014 | Vanhelle et al. |
| 8,803,670 B2 | 8/2014 | Steckel et al. |
| 8,834,390 B2 | 9/2014 | Couvillon |
| 8,836,502 B2 | 9/2014 | Culbert et al. |
| 8,867,757 B1 | 10/2014 | Ooi |
| 8,872,448 B2 | 10/2014 | Boldyrev et al. |
| 8,878,401 B2 | 11/2014 | Lee |
| 8,907,661 B2 | 12/2014 | Maier et al. |
| 8,976,139 B2 | 3/2015 | Koga et al. |
| 8,981,682 B2 | 3/2015 | Delson et al. |
| 8,987,951 B2 | 3/2015 | Park |
| 9,008,730 B2 | 4/2015 | Kim et al. |
| 9,024,738 B2 | 5/2015 | Van Schyndel et al. |
| 9,054,605 B2 | 6/2015 | Jung et al. |
| 9,058,077 B2 | 6/2015 | Lazaridis et al. |
| 9,086,727 B2 | 7/2015 | Tidemand et al. |
| 9,104,285 B2 | 8/2015 | Colgate et al. |
| 9,122,330 B2 | 9/2015 | Bau et al. |
| 9,134,796 B2 | 9/2015 | Lemmons et al. |
| 9,172,669 B2 | 10/2015 | Swink et al. |
| 9,218,727 B2 | 12/2015 | Rothkopf et al. |
| 9,256,287 B2 | 2/2016 | Shinozaki et al. |
| 9,274,601 B2 | 3/2016 | Faubert et al. |
| 9,280,205 B2 | 3/2016 | Rosenberg et al. |
| 9,286,907 B2 | 3/2016 | Yang et al. |
| 9,304,587 B2 | 4/2016 | Wright et al. |
| 9,361,018 B2 | 6/2016 | Pasquero et al. |
| 9,396,629 B1 | 7/2016 | Weber et al. |
| 9,430,042 B2 | 8/2016 | Levin |
| 9,436,280 B2 | 9/2016 | Tartz et al. |
| 9,442,570 B2 | 9/2016 | Slonneger |
| 9,449,476 B2 | 9/2016 | Lynn et al. |
| 9,466,783 B2 | 10/2016 | Olien et al. |
| 9,489,049 B2 | 11/2016 | Li |
| 9,496,777 B2 | 11/2016 | Jung |
| 9,501,149 B2 | 11/2016 | Burnbaum et al. |
| 9,513,704 B2 | 12/2016 | Heubel et al. |
| 9,535,500 B2 | 1/2017 | Pasquero et al. |
| 9,539,164 B2 | 1/2017 | Sanders et al. |
| 9,557,830 B2 | 1/2017 | Grant |
| 9,600,037 B2 | 3/2017 | Pance et al. |
| 9,632,583 B2 | 4/2017 | Virtanen et al. |
| 9,727,182 B2 * | 8/2017 | Deokar .............. G06F 3/044 |
| 2003/0117132 A1 | 6/2003 | Klinghult |
| 2004/0029082 A1 * | 2/2004 | Fournier .......... G09B 21/004 |
| | | 434/112 |
| 2005/0036603 A1 | 2/2005 | Hughes |
| 2005/0230594 A1 | 10/2005 | Sato et al. |
| 2006/0209037 A1 | 9/2006 | Wang et al. |
| 2006/0223547 A1 | 10/2006 | Chin et al. |
| 2006/0252463 A1 | 11/2006 | Liao |
| 2007/0106457 A1 | 5/2007 | Rosenberg |
| 2007/0152974 A1 | 7/2007 | Kim et al. |
| 2008/0062145 A1 | 3/2008 | Shahoian |
| 2008/0084384 A1 | 4/2008 | Gregorio et al. |
| 2008/0111791 A1 | 5/2008 | Nikittin |
| 2009/0085879 A1 | 4/2009 | Dai et al. |
| 2009/0115734 A1 | 5/2009 | Fredriksson et al. |
| 2009/0166098 A1 | 7/2009 | Sunder |
| 2009/0167702 A1 | 7/2009 | Nurmi |
| 2009/0167704 A1 | 7/2009 | Terlizzi et al. |
| 2009/0174672 A1 | 7/2009 | Schmidt |
| 2009/0225046 A1 | 9/2009 | Kim et al. |
| 2009/0243404 A1 | 10/2009 | Kim et al. |
| 2009/0267892 A1 | 10/2009 | Faubert |
| 2009/0313542 A1 | 12/2009 | Cruz-Hernandez et al. |
| 2010/0116629 A1 | 5/2010 | Borissov et al. |
| 2010/0225600 A1 | 9/2010 | Dai et al. |
| 2010/0328229 A1 | 12/2010 | Weber et al. |
| 2011/0115754 A1 | 5/2011 | Cruz-Hernandez |
| 2011/0128239 A1 | 6/2011 | Polyakov et al. |
| 2011/0132114 A1 | 6/2011 | Siotis |
| 2011/0205038 A1 | 8/2011 | Drouin et al. |
| 2012/0062491 A1 | 3/2012 | Coni et al. |
| 2012/0127071 A1 | 5/2012 | Jitkoff et al. |
| 2012/0127088 A1 | 5/2012 | Pance et al. |
| 2012/0223824 A1 | 9/2012 | Rothkopf |
| 2012/0235942 A1 | 9/2012 | Shahoian |
| 2012/0274508 A1 * | 11/2012 | Brown ............ G04F 10/00 |
| | | 342/357.25 |
| 2012/0319827 A1 | 12/2012 | Pance et al. |

(56) References Cited

U.S. PATENT DOCUMENTS

| | | | |
|---|---|---|---|
| 2012/0319981 A1* | 12/2012 | Habas | G09B 21/003 345/173 |
| 2012/0327006 A1 | 12/2012 | Israr et al. | |
| 2013/0016042 A1 | 1/2013 | Makinen et al. | |
| 2013/0017516 A1* | 1/2013 | Tyler | G04B 25/02 434/114 |
| 2013/0044049 A1 | 2/2013 | Biggs et al. | |
| 2013/0149674 A1* | 6/2013 | Anderson | G09B 21/003 434/114 |
| 2013/0207793 A1 | 8/2013 | Weaber et al. | |
| 2013/0278401 A1 | 10/2013 | Flaherty et al. | |
| 2014/0125470 A1 | 5/2014 | Rosenberg | |
| 2014/0134575 A1* | 5/2014 | Kim | G09B 21/025 434/114 |
| 2015/0097800 A1 | 4/2015 | Grant et al. | |
| 2015/0116205 A1 | 4/2015 | Westerman et al. | |
| 2015/0126070 A1 | 5/2015 | Candelore | |
| 2015/0130730 A1 | 5/2015 | Harley et al. | |
| 2015/0135121 A1 | 5/2015 | Peh et al. | |
| 2015/0277562 A1 | 5/2015 | Bard et al. | |
| 2015/0234493 A1 | 8/2015 | Parivar et al. | |
| 2015/0331528 A1* | 11/2015 | Robinson | G09B 21/004 345/173 |
| 2015/0338919 A1 | 11/2015 | Weber et al. | |
| 2015/0349619 A1 | 12/2015 | Degner et al. | |
| 2016/0011664 A1 | 1/2016 | Silvanto et al. | |
| 2016/0018920 A1* | 1/2016 | Deokar | G06F 3/044 345/174 |
| 2016/0019817 A1* | 1/2016 | Deokar | G08B 6/00 340/4.12 |
| 2016/0284235 A1* | 9/2016 | Zhang | G09B 21/003 |
| 2016/0328930 A1 | 11/2016 | Weber et al. | |
| 2017/0003744 A1 | 1/2017 | Bard et al. | |
| 2017/0024010 A1 | 1/2017 | Weinraub | |
| 2017/0084816 A1* | 3/2017 | Martin | H01L 41/0471 |
| 2017/0148281 A1* | 5/2017 | Do | F16F 6/00 |
| 2017/0220005 A1* | 8/2017 | Han | G06F 3/01 |
| 2017/0352291 A1* | 12/2017 | Kim | G09B 21/004 |
| 2018/0350264 A1* | 12/2018 | Dhar | G09B 21/003 |

FOREIGN PATENT DOCUMENTS

| | | |
|---|---|---|
| CN | 101663104 | 3/2010 |
| CN | 101872257 | 10/2010 |
| EP | 1686776 | 8/2006 |
| EP | 2743798 | 6/2014 |
| JP | 2004129120 | 4/2004 |
| JP | 2004236202 | 8/2004 |
| JP | 2010537279 | 12/2010 |
| JP | 2010540320 | 12/2010 |
| KR | 20050033909 | 4/2005 |
| TW | 2010035805 | 10/2010 |
| WO | WO2002/073587 | 9/2002 |
| WO | WO2006/091494 | 8/2006 |
| WO | WO2007/049253 | 5/2007 |
| WO | WO2007/114631 | 10/2007 |
| WO | WO2009/038862 | 3/2009 |
| WO | WO2010/129892 | 11/2010 |
| WO | WO2013/169303 | 11/2013 |
| WO | WO2014/066516 | 5/2014 |

OTHER PUBLICATIONS

Hill et al., "Real-time Estimation of Human Impedance for Haptic Interfaces," Stanford Telerobotics Laboratory, Department of Mechanical Engineering, Standford University, 6 pages, at least as early as Sep. 30, 2009.

Lee et al, "Haptic Pen: Tactile Feedback Stylus for Touch Screens," Mitsubishi Electric Research Laboratories, http://wwwlmerl.com, 6 pages, Oct. 2004.

* cited by examiner

TACTILE OUTPUT FOR WEARABLE DEVICE

CROSS-REFERENCE TO RELATED APPLICATION(S)

This application is a nonprovisional patent application of and claims the benefit of U.S. Provisional Patent Application No. 62/305,245, filed Mar. 8, 2016 and titled "Tactile Output for Wearable Device," the disclosure of which is hereby incorporated by reference herein in its entirety.

FIELD

The described embodiments relate generally to output mechanisms for electronic devices. More particularly, the present embodiments relate to output mechanisms that provide tactile outputs to a user of a wearable electronic device.

BACKGROUND

Electronic devices utilize various types of output devices to provide information to a user. For example, smartphones, laptop computers, and wearable electronic devices (e.g., smartwatches) may include displays, LEDs or other illuminating elements, speakers, and the like. Many output devices require a user to look at or listen to the output device in order to receive the information, however. Techniques for conveying information without audio or visual outputs have been developed, such as braille or other tactile writing systems. Such systems may be useful for visually impaired individuals, or when audio or visual outputs are inappropriate.

SUMMARY

A wearable item comprises a flexible strap and actuators within the flexible strap. The actuators are configured to dynamically form protrusions along the flexible strap. The protrusions present tactilely-perceptible information.

A wearable electronic device comprises a computing component and a band coupled to the computing component. The band comprises an inner surface for contacting a wearer, an outer surface opposite the inner surface, and tactile output mechanisms configured to selectively form and remove tactile symbols along at least one of the inner surface and outer surface.

A method for providing tactile output via a band of a wearable electronic device comprises receiving, at a band including actuators configured to selectively form deformations along a surface of the band, information from a computing component coupled to the band, and in response to receiving the information, causing a set of the actuators to form a pattern of deformations along the surface.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
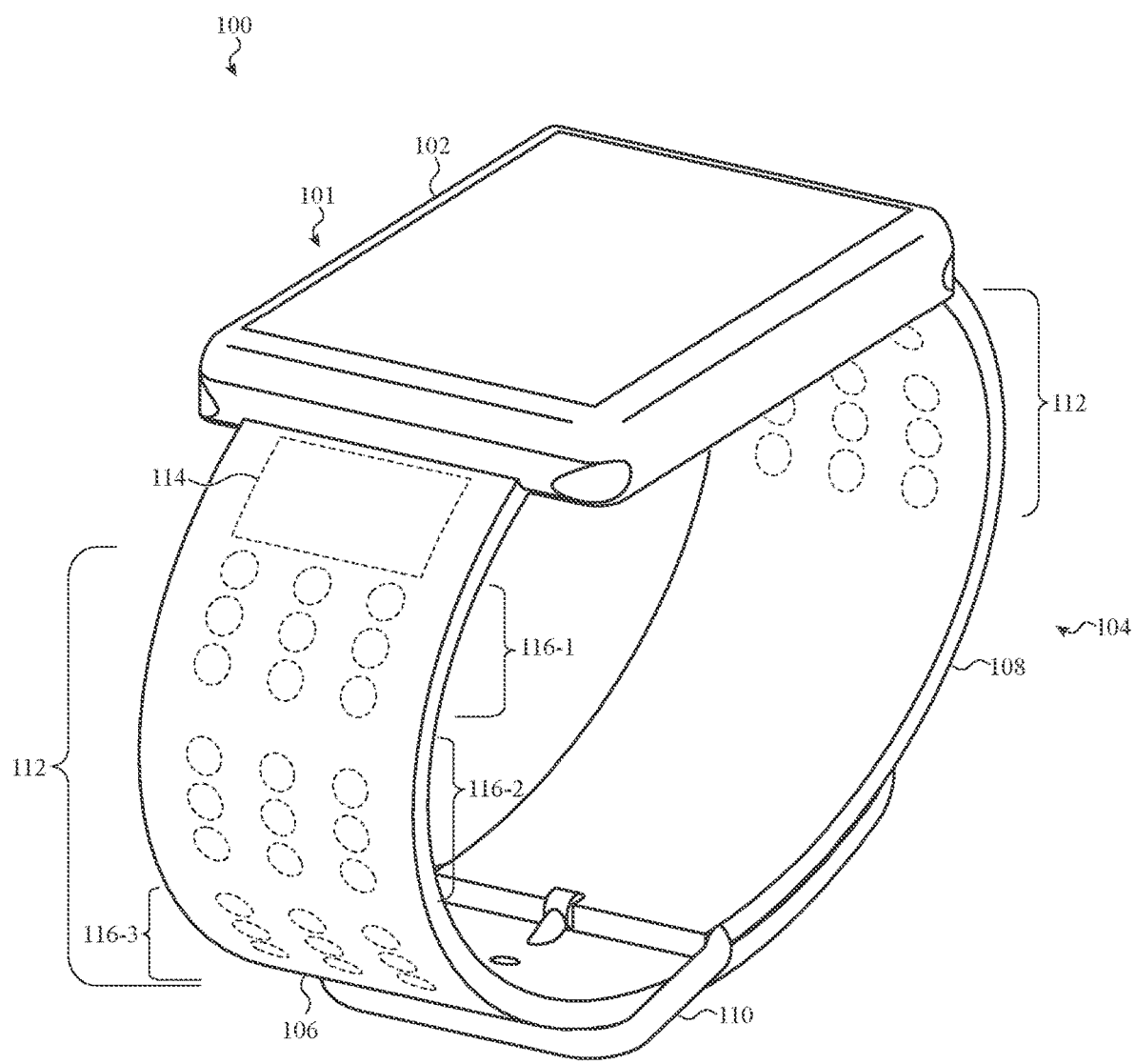
FIG. 1 shows a wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Traditional output mechanisms used in electronic devices may present information aurally or visually. For example, display screens and indicator lights require a user to visually perceive the electronic device, and speakers require the user to listen to the audible output. Users who have visual impairments may not be able to adequately perceive visual outputs such as screens and lights, however. While information may instead be conveyed to such users by audible indicators (e.g., beeps, spoken words, or the like), this may be disruptive in many circumstances, and may take longer than desirable to convey the information.

Accordingly, the present disclosure relates to tactile output mechanisms that may facilitate tactile presentation of information by an electronic device. The tactile output mechanisms may form alphanumeric characters, braille characters, logos, graphics, or other information-conveying symbols. The term "symbol," as used herein, encompasses all of the foregoing examples.

A wearable item may be operationally connected to an electronic device. The electronic device may instruct the wearable item to form tactilely-perceptible outputs in order to convey information to a user. The wearable item may be a band, strap, lanyard or similar connector, or may be a piece of clothing, may be an accessory such as a ring, glasses, or the like. A wearable item may be formed from fabric, leather, polymer, and so on.

For example, a band for a wearable electronic device, such as a smartwatch, may include actuators that can dynamically and selectively form protrusions (or other deformations) along a surface of the band. The protrusions may be formed in particular patterns to convey particular information. For example, the protrusions may be selectively actuated to form braille characters that a user can then read by touch. Actuators (or other tactile output mechanisms) may also or instead be dynamically and/or selectively actuated to form protrusions in shapes of alphanumeric characters. The actuators are dynamic (e.g., dynamically actuated) insofar as they may form and remove protrusions as necessary to convey information; the protrusions may last as long as necessary or desired and need not be static. The actuators are selective insofar as each actuator may be independently actuated from one another. A person interacting with the protrusions may visually or tactilely perceive or otherwise discern the protrusions, insofar as they are an example of a tactile output mechanism.

The protrusions may be formed on an outer surface of the band, an inner surface of the band (e.g., a surface that is in contact with a wearer's body), both, a side of the band, and so on. In some cases, information may be conveyed differently when the protrusions are formed on the inner surface as compared to the outer surface. In particular, whereas braille characters may be formed on the outer surface, some users may not be able to resolve braille characters when they are formed on the inner surface of a band (e.g., when they are pressed against the user's wrist). Thus, in some embodiments the protrusions on the inner surface may not form characters, but instead may be pulsed (e.g., to produce a temporal pattern of taps or contacts) or may form less detailed shapes or patterns (e.g., the protrusions may be progressively formed around the inner circumference of the band, producing a feeling of the protrusions encircling the user's wrist). In other embodiments, braille or other alpha-numeric characters may be formed on an inner surface of the band, or on both inner and outer surfaces (either concurrently or separately).

The tactilely-perceptible information conveyed by the tactile output mechanisms described herein may be any type of text- or character-based information (or other types of information). For example, in the case of braille characters formed on the outer surface of the band, the characters may convey a time of day (e.g., from a timekeeping component of the electronic device), rendered text (e.g., from emails, text messages, webpages, e-books, and the like), or transcribed speech (e.g., incoming speech from a voice call or voicemail), symbols indicating a status of an electronic device (e.g., a power state or level, reception of a communication, and so on), and the like.

Embodiments of electronic devices that include actuators in a band to provide tactile outputs are discussed below with reference to FIGS. 1-8C. However, those skilled in the art will readily appreciate that the detailed description given herein with respect to these Figures is for explanatory purposes only and should not be construed as limiting.

FIG. 1 shows a wearable device 100 (also referred to as "device 100"). The device 100 may be any appropriate wearable device, including an electrical or mechanical wrist watch, an electronic computing component, a health monitoring device, a timekeeping device, a stopwatch, etc. The device 100 may include a computing component 101 and a wearable band 104.

The computing component 101 includes a housing 102 that forms an outer surface or partial outer surface and protective case for the internal components of the computing component 101. For example, the computing component 101 may include, in the housing 102, a processing unit (not shown) for performing various system and application tasks, alone or in conjunction with other sensors, processors, circuits, and the like. For example, the processing unit may perform tasks related to timekeeping, communications (e.g., wired or wireless communications), health monitoring, and the like. Other components of the computing component 101 that may be housed in or coupled to the housing 102 include, without limitation, a display device, audio output devices, input devices (e.g., touch-sensitive surfaces, buttons, dials), biometric sensors, cameras, and orientation detectors.

The housing 102 may also include mounting features formed on opposite ends of the housing 102 to connect a wearable item 104 (also referred to as "band 104") to the housing 102. The band 104 may include a first strap 106, a second strap 108, and a clasp 110 for releasably coupling the first strap 106 to the second strap 108. The first strap 106 and the second strap 108 may be separate components (as shown in FIG. 1) or they may be a single component. For example, a single length of material may pass through the housing 102 and/or through loops or other mounting structures of the housing 102 to form two segments extending from opposite sides of the housing 102 (e.g., segments analogous to the first strap 106 and the second strap 108).

The first and second straps 106, 108 may include a plurality of actuators 112 configured to selectively form protrusions, or any other tactilely-perceptible output such as cavities, depressions, or other deformations, along a surface of the band 104. In some cases, only one of the first and second straps 106, 108 includes actuators 112.

The protrusions may be used to form various tactile symbols including braille characters, dot-pattern representations of alpha-numeric characters (e.g., a pattern of dots that looks like a particular character), representations of shapes or images, or the like. The actuators 112 may also be used to provide tactile stimulation to a user without conveying character-level information (e.g., the actuators may cause a vibrating sensation on a user's wrist).

The first and second straps 106, 108 may be flexible, for example, to facilitate the application of the wearable device 100, and to provide a comfortable and secure fit to a wearer. The first and second straps 106, 108 may be flexible along substantially their whole lengths, or only along certain portions.

The first and second straps 106, 108 may be formed from or include any appropriate materials. For example, the first and second straps 106, 108 may include one or more layers of flexible material, such as fabrics (e.g., natural or synthetic fabrics), leather, polymers (e.g., silicone, thermoplastic polyurethane (TPU), or polyvinylchloride), or any other appropriate material. As another example, the first and second straps 106, 108 may include links or segments of metals, hard plastics, or the like. The actuators may be incorporated into, or embedded within, the first and second straps 106, 108 in any appropriate way, such as insert molding, insert casting, mechanical assembly (e.g., manual or automatic placement of actuators, electrodes, etc. in the first and second straps 106, 108), or the like.

As shown in FIG. 1, the actuators 112 are grouped into arrays 116 of actuators 112, each array 116 having nine actuators arranged into a three-by-three grid, though other configurations, shapes, sizes, and numbers of arrays 116 and actuators 112 are also contemplated. For example, the actuators 112 may not be separated into arrays, either functionally or physically. As noted above, the first and second straps 106, 108 may be sufficiently flexible to allow for the band 104 to be opened and closed. In such cases, the areas of the band 104 corresponding to the arrays 116 are also flexible. For example, components of the actuators may be formed from or include flexible materials and/or structures that allow the band to flex along the areas corresponding to the arrays 116.

When multiple characters are to be presented on the band 104, and there are not enough actuators on the band 104 to present all of the characters at once, the characters may be presented sequentially. For example, a braille character (or any other symbol) may be formed on a surface of the first strap 106 for a duration of time before the braille character is removed and/or replaced with another character. The duration may be exclusively time based (e.g., 0.5 seconds, 1 second, 2 seconds, or any other appropriate time), or it may be based on some other factor or combination of factors, such as whether the user has touched the braille character (as determined by a touch and/or force sensor), whether the user has moved the device into a particular orientation and/or position (for example, raising or rotating the device or wearable item), how long the device has been in a particular orientation and/or position, or the like.

One or both of the first and second straps 106, 108 may include a controller 114. The controller 114 may be configured to receive information and/or commands from the computing component 101 and, in response to and based on the information and/or commands, selectively cause the actuators 112 to form protrusions along a surface of the band 104. For example, the controller 114 may receive information from the computing component indicating a time of day. The controller 114 may then determine which actuators 112 should be actuated in order to cause an appropriate pattern of protrusions on the appropriate surface of the band to indicate the time of day to a user. The controller 114 may perform other functions as well. For example, the controller 114 (alone or in conjunction with other components of the band 104 and/or the computing component 101) may perform timekeeping functions and may communicate with the computing component via one or more wired or wireless (e.g., Bluetooth or WiFi) interfaces and/or protocols.

Each array 116 of actuators 112 may be used to represent a single character of a braille alphabet or other symbol. For example, the controller 114 may receive information from the computing component indicating the time of day. The controller 114 may then determine which actuators 112 to actuate in order to present the time of day in braille. For example, the controller 114 may cause each array 116 on the first strap 106 to present one digit of the time of day in braille characters, as described herein.

Figure 2:
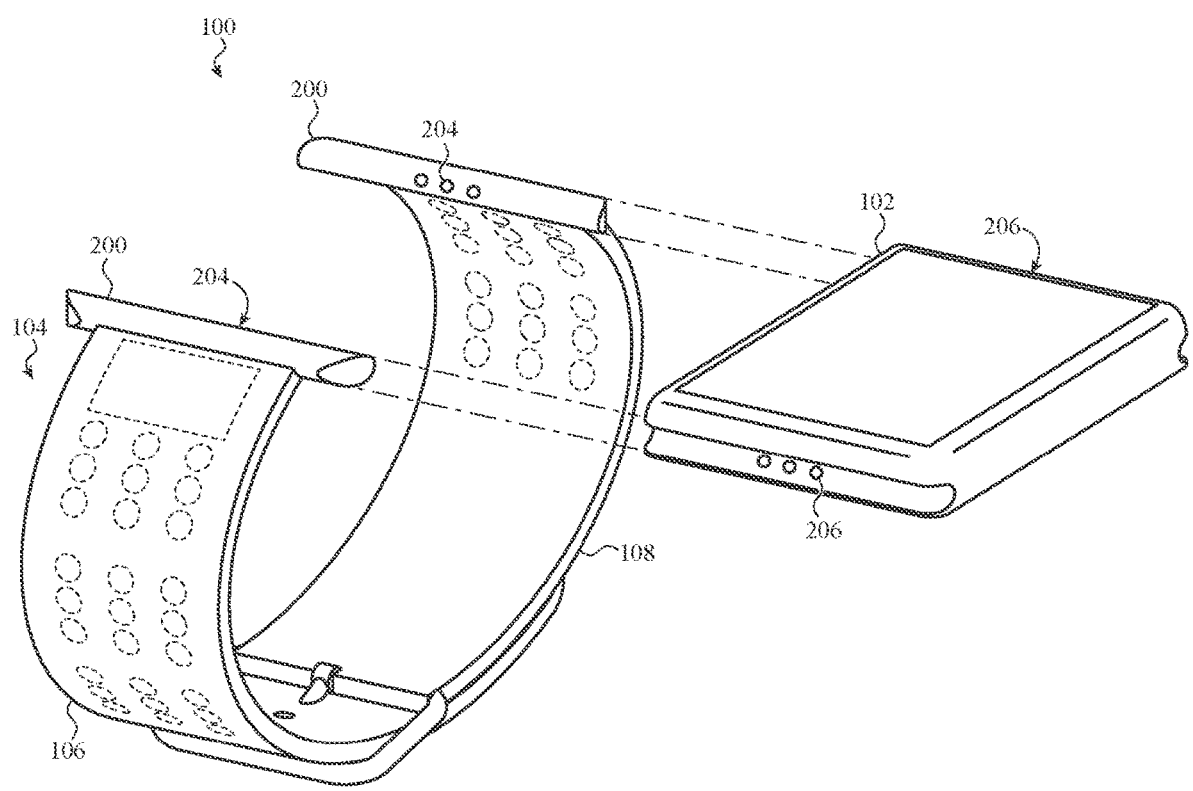
FIG. 2 shows an exploded view of the wearable electronic device of FIG. 1, with a band detached from the device.

One or both of the first and second straps 106, 108 may include an optional battery (not shown) electrically connected to the controller 114 and/or the actuators 112 to provide electrical power thereto. The battery may also provide electrical power to the computing component through electrical and/or data connectors 204, 206 (FIG. 2). The optional battery and the controller 114 of the band 104 may facilitate timekeeping functions of the band even after the battery of the computing component 101 has died, or in embodiments where the band 104 does not communicate with or receive electrical power from the computing component. For example, the band 104 may be configured to receive information corresponding to a time of day from the computing component 101 as long as the battery of the computing component 101 has sufficient charge or is not in a power conservation mode, and to take over timekeeping functions once the battery of the computing component 101 dies or ceases to provide information to the controller 114 (e.g., as a result of the battery dying).

FIG. 2 shows an exploded view of the device 100, with the housing 102 removed from the band 104. The first and second straps 106, 108 each include a lug 200 that is configured to retain the first and second straps 106, 108 to the housing 102. The housing 102 includes lug receptacles 202 into which the lugs 200 are received.

The lugs 200 each include first electrical connectors 204 that are operatively coupled to the controller 114, the optional battery (not shown), and/or other appropriate components of the band 104. In implementations where the band 104 does not include a controller 114, the first electrical connectors 204 may be coupled directly to the actuators 112 via electrodes.

The housing 102 includes second electrical connectors 206 that are configured to couple to the first electrical connectors 204. Thus, when the first and second straps 106, 108 are coupled to the housing 102 via the lugs 200 and the lug receptacles 202, the first electrical connectors 204 are electrically and/or communicatively coupled to the second electrical connectors 206. The first and second straps 106, 108 may be configured to be removably coupled to the housing 102. In such cases, the electrical connectors 204, 206 may be quick-release style connectors such that a user can remove and/or swap bands of the device 100 without damaging the housing 102 and/or the band 104, and without needing to manually re-connect wires, electrodes, or the like.

Figure 3A:
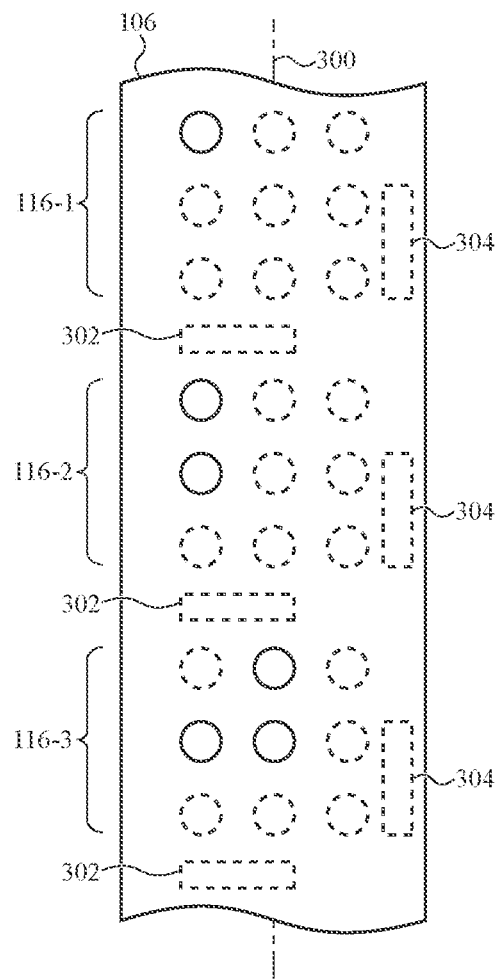
FIGS. 3A-3D show plan views of a band for a wearable electronic device.

FIG. 3A shows a partial view of the first strap 106 where the actuators 112 have been actuated to present braille digits corresponding to a time of 1:20. Actuators 112 shown in solid lines have been actuated, and therefore correspond to protrusions on the first strap 106, whereas unactuated actuators 112 are shown in dashed lines and do not correspond to protrusions. In particular, the array 116-1 forms the braille character for "1," array 116-2 forms the braille character for "2," and the array 116-3 forms the braille character for "3." The braille characters shown in FIG. 2A are oriented such that a bottom of the braille character is substantially perpendicular to a longitudinal axis 300 of the band 104. This orientation of the braille characters corresponds to a top-to-bottom reading direction.

Figure 3B:
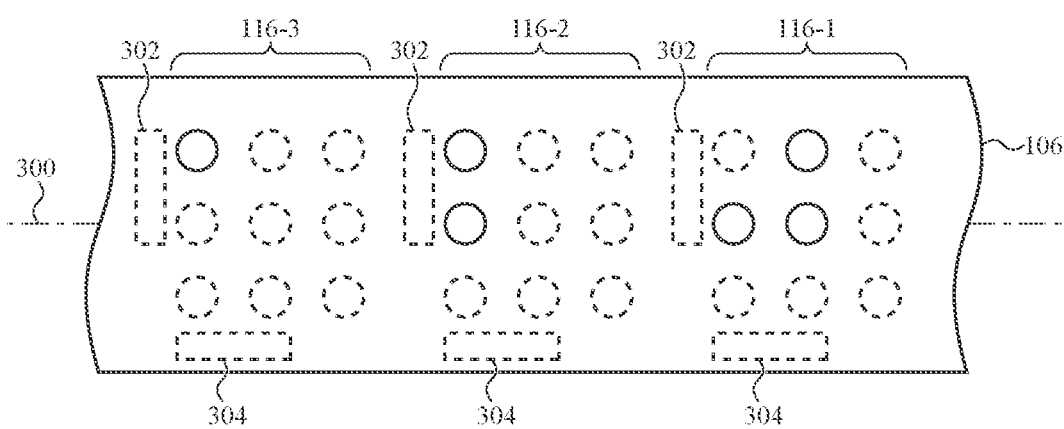

FIG. 3B shows another partial view of the first strap 106 where the actuators 112 have been actuated to present braille digits corresponding to a time of 1:20. Whereas the bottom of the braille characters in FIG. 3A were substantially perpendicular to the longitudinal axis 300, the bottom of the braille characters in FIG. 3B are substantially parallel to the longitudinal axis 300 corresponding to a left-to-right reading direction. Whether the characters are presented in a top-to-bottom reading orientation (FIG. 3A) or a left-to-right reading orientation (FIG. 3B) may be determined by user preference, by the orientation of the device 100 (as determined by an orientation detector), by a placement of a user's fingers on the first strap 106 (as determined by one or more touch sensors or touch sensitive regions), or any other appropriate criteria.

Braille cells (e.g., regions capable of representing a braille character) may comprise six dot positions arranged in three rows and two columns (e.g., a 3×2 array). By positioning the actuators 112 in 3×3 arrays 116, the actuators can form complete braille characters in either orientation described above. In each case, one column of each array 116 may be unused. For example, in FIG. 3A, the actuators 112 in any two adjacent columns (such as the first and second columns, as shown) may be used to form the dots of the braille character, with the third column being unused. Similarly, FIG. 3B shows the third column of each array 116 being unused. In some Braille systems, all of the digits (0-9) can be represented in a four dot cell. Accordingly, in embodiments where a band 104 is only configured to present digits, the arrays 116 may be 2×2 arrays. The symmetry of the 2×2 arrays allows digits to be represented in braille in both top-to-bottom and left-to-right reading orientations without any unused rows or columns. As noted above, any appropriate number and orientation of actuators 112 in an array 116 may be used.

Figure 4A:
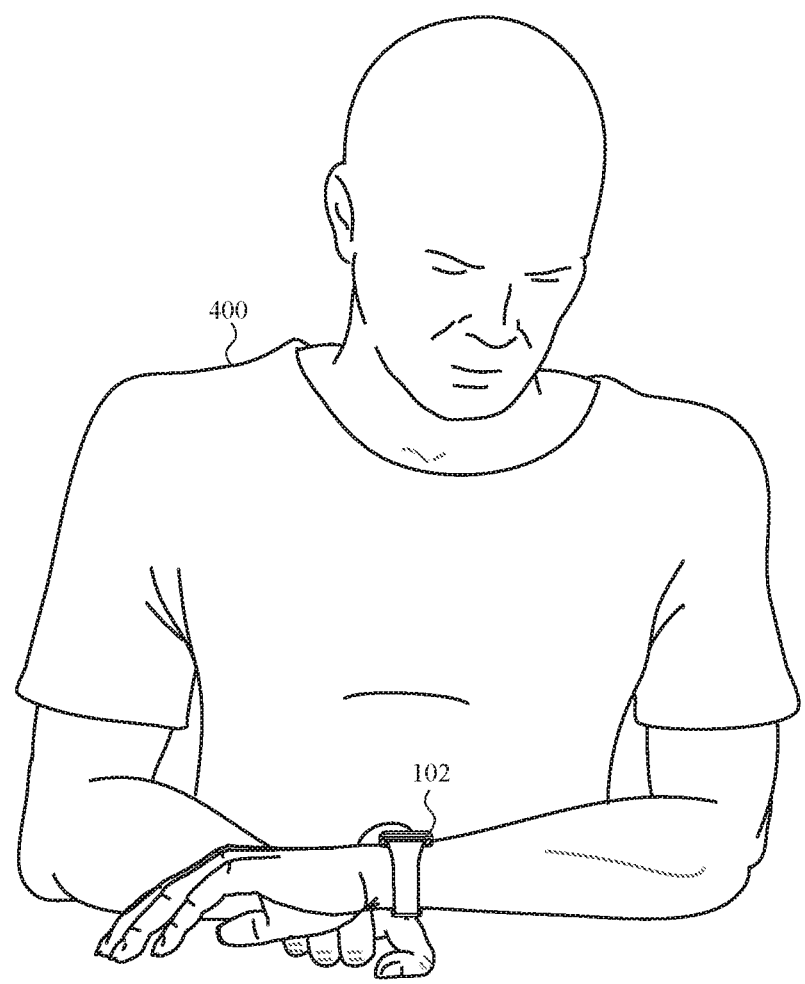
FIGS. 4A-4B show a wearable electronic device worn by a user.
Figure 4B:
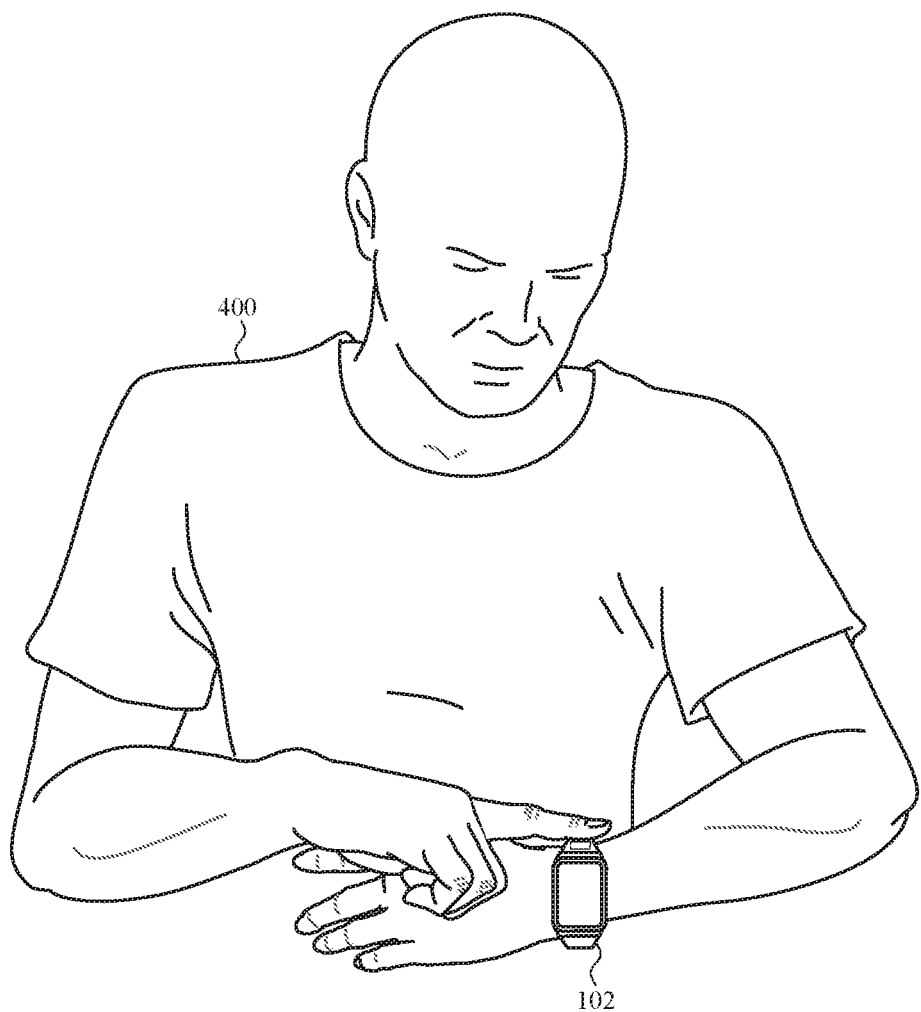

The orientation in which braille characters are presented on the band 104 may be determined in real-time, based on how a user intends to read the characters at that particular time. Various sensors and algorithms may be used to determine the reading orientation being used by a user. For example, because of the natural biomechanics of a user's arms and body, the orientation of the housing 102 may be a sufficiently reliable indicator of a user's intended reading direction. Accordingly, an orientation sensor (or sensor system, including one or more sensors and processing circuitry) may determine an orientation of the device 100 when braille characters are to be displayed. If the determined orientation is indicative of a left-to-right reading orientation, then the braille characters will be presented from left to right. If the determined orientation is indicative of a top-to-bottom reading orientation, then the braille characters will be presented from top to bottom. FIGS. 4A-4B illustrate how the device 100 may be oriented differently based on the user's planned reading orientation. In FIG. 4A, a user intends to read the braille characters in a top-to-bottom direction, which may result in the main plane of the housing 102 (e.g., corresponding to a display surface of display device) being substantially parallel to a horizontal direction. In FIG. 4B, the user intends to read the braille characters in a left-to-right direction, which may result in the main plane of the housing 102 being oblique to the horizontal direction.

Instead of or in addition to the orientation sensing technique described above, touch and/or force sensors may be used to determine the reading orientation. For example, first touch sensitive regions 302 (FIG. 3A) may disposed along first edges of the arrays 116 perpendicular to the longitudinal axis 300 of the band 104, and second touch sensitive regions 304 may disposed along second edges of the arrays 116 parallel to the longitudinal axis 300 of the band 104. If a user intends to read the braille characters in a top-to-bottom direction, the user's finger may be likely to contact one or more of the first touch sensitive regions 302, and less likely to contact the second touch sensitive regions 304. Similarly, if the user intends to read the braille characters in a left-to-right direction, the user's finger may be likely to contact one or more of the second touch sensitive regions 304, and less likely to contact the first touch sensitive regions 302. In some embodiments, the touch-sensitive regions may overlie or otherwise be contiguous with the arrays 116. Touch-sensitive regions may also or instead be force-sensitive.

Figure 3C:
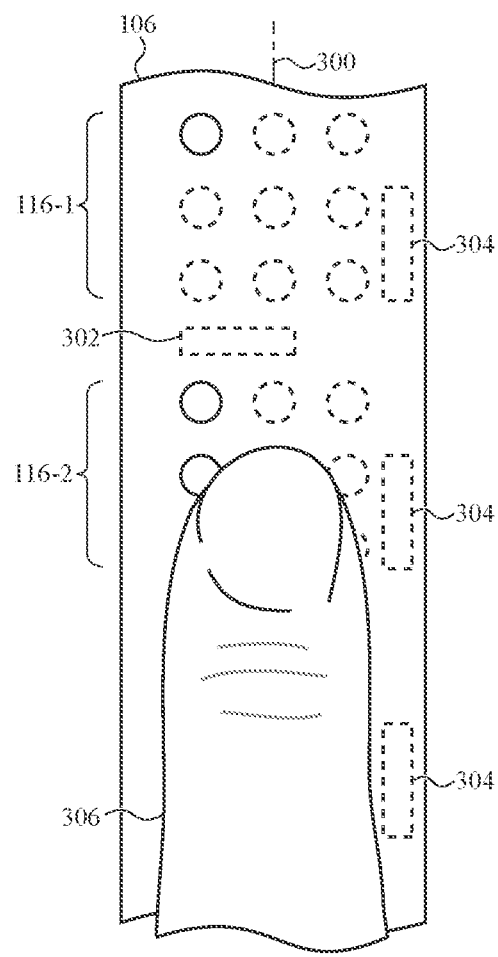
Figure 3D:
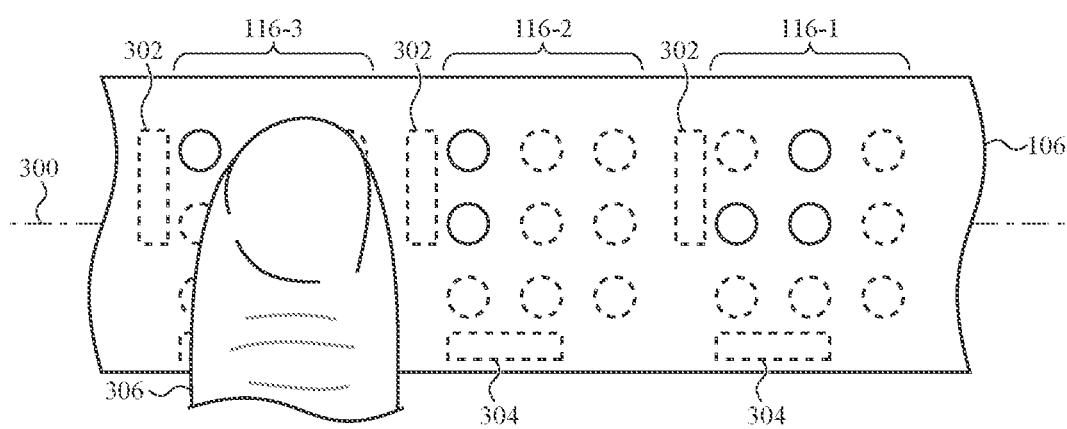

FIG. 3C shows the portion of the first strap 106 with a finger 306 placed on the array 116-1, corresponding to a top-to-bottom reading position. As shown in FIG. 3C, the finger 306 contacts a first touch sensitive region 302 and does not contact the second touch sensitive regions 304. In FIG. 3D, a finger 306 is placed on the array 116-3, corresponding to a left-to-right reading position. As shown in FIG. 3D, the finger 306 contacts a second touch sensitive region 304, and does not contact the first touch sensitive regions 302. The first and second touch sensitive regions 302, 304 may be positioned on the band 104 to reduce the likelihood that a finger 306 will simultaneously contact both first and second regions when the finger is placed in a reading position.

The touch sensitive regions 302, 304 may be operatively coupled (e.g., via electrodes in the band 104) to the controller 114 in the band 104 and/or the computing component 101 (e.g., via the electrical connectors 204, 206 that electrically couple components of the band 104 to the computing component. Accordingly, the controller 114 and/or the computing component 101 may detect properties of the touch sensitive regions that are indicative of touch events. The touch sensitive regions 302, 304 may be formed from or include any appropriate material or structure that facilitates detection of touch or force, including but not limited to capacitive touch sensing components, resistive touch sensing components, quantum tunneling materials, and mechanical switches (e.g., dome switches).

The touch sensitive regions may also be used to determine when a braille character has been read in order to cease the presentation of the braille character and/or to signal that a subsequent braille character should be presented. For example, a user may interact with the device to request that information, such as the time, be presented via the arrays 116. When the user touches an array 116 to read the characters, a touch event may be detected on one or more of the touch sensitive regions. Once a touch event is detected (and after an optional delay), the device 100 may cease presenting the characters. By ceasing to present characters after they have been read, the device 100 can conserve battery power, and can avoid presenting stale information. Where additional characters are to be presented, the detection of the touch event may (after an optional delay) cause subsequent characters to be presented in place of the first characters.

The band 104 in FIGS. 1-3D has only three arrays on each strap. However, more or fewer arrays may be used. For example, four arrays 116 may be used so that each digit of a four digit time (e.g., hh:mm) may be presented at once. As another example, only one array may be provided on a band 104, and the array may transition between digits to present characters sequentially.

As noted above, the actuators 112, or a subset thereof, may be configured to form protrusions along the inner surface of the band 104. Such protrusions may be used to convey information to a user in various different ways. For example, actuators 112 that are configured to form protrusions on the inner surface of the band 104 may be actuated to act as a notification to the user. Actuating the actuators 112 for this purpose may include pulsing the actuators (e.g., to produce a pulsing or vibrating sensation), or maintaining the protrusions for a specified duration or until the user dismisses or acknowledges the event that triggered the notification. Such events may include, for example, incoming messages or calls, changes in the time (e.g., the actuators 112 may notify the user every five minutes of elapsed time, or any other appropriate interval), or the like.

The actuators 112 that are configured to form protrusions along the inner surface of the band 104 may convey information in other ways as well. For example, a time may be indicated by a series of pulses corresponding to the hours and minutes of the current time. Where the band 104 includes actuators 112 on both the first and the second straps 106, 108, the actuators 112 of one strap may be used to indicate the hours (e.g., with one pulse corresponding to one hour), and the actuators 112 of the other strap may be used to indicate the minutes (e.g., with one pulse corresponding to one, five, or ten minutes). Accordingly, a user can simply count the number of pulses from each strap to determine the time. As a specific example, three pulses of the actuators 112 on the second strap 108 may correspond to three o'clock, and four pulses (each corresponding to five minutes of elapsed time) of the actuators 112 on the first strap 106 may correspond to 20 minutes. Thus, the user can determine that it is 3:20.

As another example, the actuators 112 that are configured to form protrusions along the inner surface of the band 104 may be configured to convey the time to a user by mimicking the location of an hour or minute hand along the inner surface of the band 104. For example, at 3:00, protrusions may be formed along the inner surface of the second strap 108 to a location corresponding to 3:00 (e.g., the protrusions may span 90 degrees around the inner circumference of the band 104). As the hours progress, the protrusions may also progress around the circumference of the band 104. The actuators 112 may remain actuated as the day advances (e.g., so that at 9:00, protrusions are formed continuously along about 270 degrees of the inner circumference). Alternatively, only a set of actuators near the indicated time are actuated at a given time (e.g., at 9:00, a set of actuators near about 270 degrees along the inner circumference are actuated). This technique applies equally to indicating minutes. For example, the protrusions may progress around the inner circumference once per hour, rather than once per twelve hours.

The same or a similar technique may also be used to convey information other than a time. For example, the protrusions may act as a status or progress indicator, where actuation of all actuators 112 along the inner (or outer) surface indicates the completion of a task (e.g., a download, a physical activity goal, a timer, or the like). A user can determine the relative progress of a task based on how many protrusions are formed on the inner (or outer) surface of the band, or the locations of the protrusions.

Figure 5:
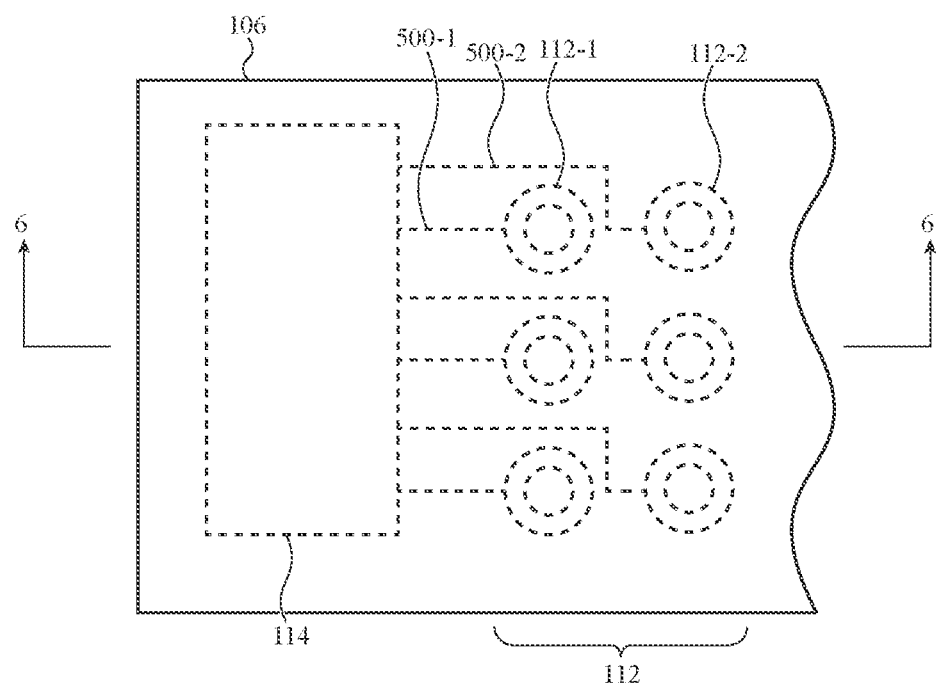
FIG. 5 is a partial plan view of a band for a wearable electronic device.

FIG. 5 shows a portion of the first strap 106. As described above, the first strap 106 may include a controller 114 and actuators 112. The actuators 112 are each operatively coupled to the controller 114 via electrodes 500. For example, the actuator 112-1 is coupled to the controller 114 via the electrode 500-1, and the actuator 112-2 is coupled to the controller via the electrode 500-2. The electrodes 500 may be configured to convey any appropriate signal and/or electrical energy to the actuators 112. While FIG. 5 shows the first strap 106, it will be understood that the second strap 108 may have the same or similar configuration and/or components.

Figure 6A:
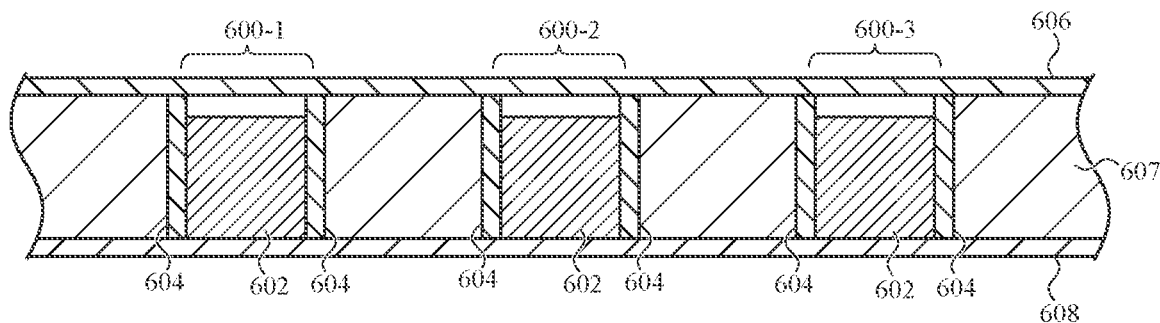
FIGS. 6A-6C are partial cross-sectional views of the band of FIG. 5 with electrothermal actuators, taken along line 6-6 in FIG. 5.
Figure 6B:
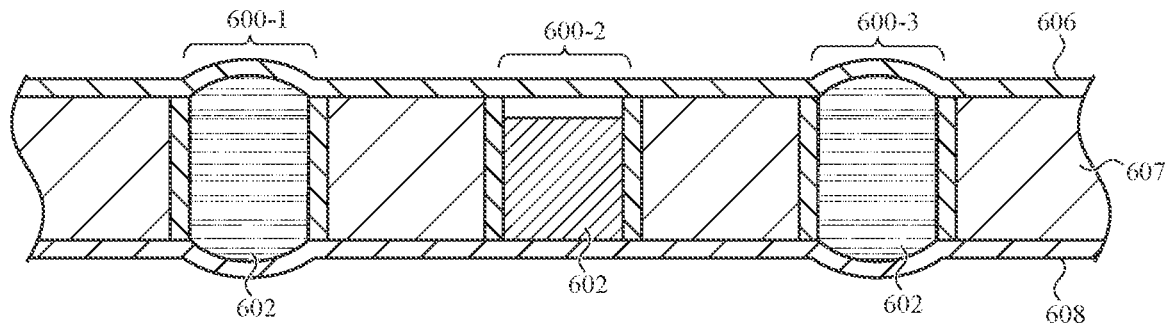
Figure 6C:
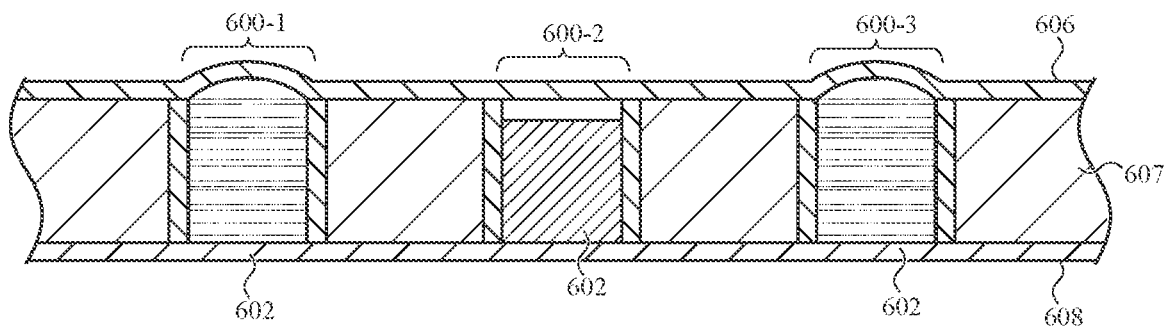

FIGS. 6A-6C are partial cross-sections of an embodiment of the first strap 106 viewed along line 6-6 in FIG. 5. In this embodiment, the actuators are electrothermal actuators 600 that contain an actuation material 602 that has a first density when the material is at a first temperature and/or physical phase (e.g., solid), and a second density when the material is at a second temperature and/or physical phase (e.g., liquid). For example, the actuation material 602 may have a higher density when it is in a solid phase than when it is in a liquid phase. This property may be exploited to create actuators that selectively from protrusions on a surface of an item (such as a surface of a watch band). In particular, the actuation material 602 may be placed in an enclosed space having at least one surface defined by a flexible material. The actuator may also include a heating element that can melt the actuation material 602, thereby causing the actuation material 602 to expand and locally deform the flexible material. The actuator may also include a cooling element that can cool and solidify the actuation material 602.

The amount of the actuation material 602 in the enclosed space may be selected so that when the actuation material 602 is in a solid phase, the flexible material of the enclosed space is not deformed, and when the actuation material is in a liquid phase, the flexible material defining the enclosed space is deformed (e.g., it protrudes outward). The actuation material 602 may be any appropriate material, such as paraffin wax or another material that changes phase at relatively low temperatures, a gas, a liquid that expands or contracts when its temperature changes, and so on.

The electrothermal actuators 600 in FIGS. 6A-6C include the actuation material 602 contained between a first layer 606 and a second layer 608. The first layer 606 may correspond to an outer surface of the first strap 106, and the second layer 608 may correspond to an inner surface of the first strap 106.

The electrothermal actuators 600 also include heating elements 604 that are configured to heat the actuation material 602. The heating elements 604 may be any material or component that can be heated to melt the actuation material 602. The heating elements 604 may be coupled to the electrodes 500 (FIG. 5). Electrical current may be provided to the heating elements 604 via the electrodes 500 to cause the heating elements 604 to heat sufficiently to melt the actuation material 602.

As shown in FIGS. 6A-6C, the heating elements 604 are shaped as cylinders that also define walls that contain the actuation material 602, but other shapes and configurations are also possible. For example, the walls that contain the actuation material 602 may not be heating elements, and the heating elements 604 may be disposed in the interior space defined by the walls and in contact with the actuation material 602. Moreover, the structure(s) and/or walls that contain the actuation material 602 may be any appropriate shape and may be formed from any appropriate material(s) or component(s).

FIG. 6A shows the first strap 106 where the actuation material 602 of each electrothermal actuator 600 is in an unexpanded state (e.g., a solid phase). FIG. 6B shows the first strap 106 where the actuation material 602 of a first electrothermal actuator 600-1 and a second electrothermal actuator 600-3 has been melted, thus expanding the actuation material 602 and causing the first and second layers 606, 608 to locally deform in an area above and below the electrothermal actuators 600-1, 600-3. The locally deformed areas may correspond to the dots of a braille character being presented on a surface of the band 104, as described above.

In FIG. 6B, the first and second layers 606, 608 are formed from or include flexible material that deforms when the actuation material 602 expands. Any appropriate flexible material may be used, such as silicone, thermoplastic polyurethane (TPU), polyvinylchloride, or the like. The first and/or second layers 606, 608 may be glued or otherwise bonded to a middle layer 607 (which itself may include a plurality of sub-layers) to prevent delamination of the layers as well as to form the enclosed space of the electrothermal actuators 600 in which the actuation material 602 is placed.

FIG. 6C shows an embodiment of the first strap 106 where the first layer 606 is formed from or includes a flexible material, and the second layer 608 is formed from or includes a material that resists deformation when the actuation material 602 expands. For example, while the actuation material 602 of the first and third electrothermal actuators 600-1, 600-3 is in an expanded state in FIG. 6C, protrusions are only formed along the first layer 606. The less deformable second layer 608 may be formed from or include any appropriate material, such as silicone or TPU that has a sufficient stiffness and/or rigidity to substantially resist deformation due to the expansion of the actuation material 602. The second layer 608 may also include rigid inserts in areas adjacent the actuation material 602 to prevent deformation of the second layer 608 when the actuation material 602 expands. Such inserts may be disks or sheets of metal, plastic, or any other appropriate material, and may be between the electrothermal actuators 600 and the second layer 608, or may be embedded or encapsulated in the material of the second layer 608.

The electrothermal actuators 600 may also include walls and/or surfaces that prevent or limit deformation when the actuation material 602 expands. For example, an electrothermal actuator 600 may include a vessel defined by one or more sidewalls and a bottom, and having an open top. The sidewalls and bottom of the vessel may contain the actuation material 602 and may resist deformation when the actuation material 602 is expanded. Thus, the actuation material 602 may expand through the open top of the vessel, thus pressing against whatever material is disposed above the actuator.

As described above, FIG. 6C illustrates an embodiment where the first layer 606 is deformable, while the second layer 608 resists deformation caused by the electrothermal actuators 600. In some cases, the roles of the first and second layers are reversed, such that the first layer 606 resists deformation and the second layer 608 allows deformation. Moreover, some portions of a layer may resist deformation from the actuators 600, while other portions allow deformation.

Figure 7A:
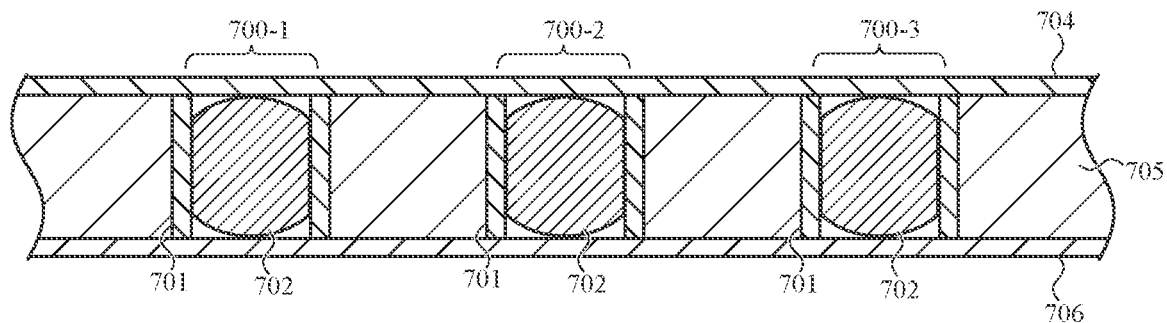
FIGS. 7A-7C are partial cross-sectional views of the band of FIG. 5 with electromechanical actuators, taken along line 6-6 in FIG. 5.
Figure 7B:
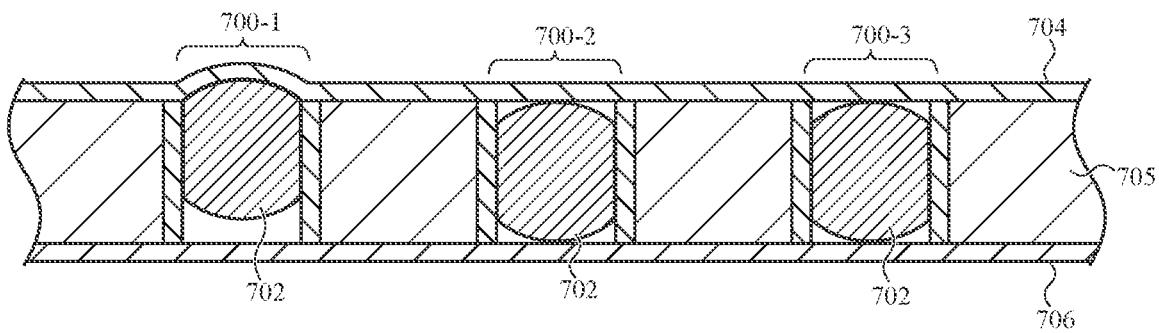
Figure 7C:
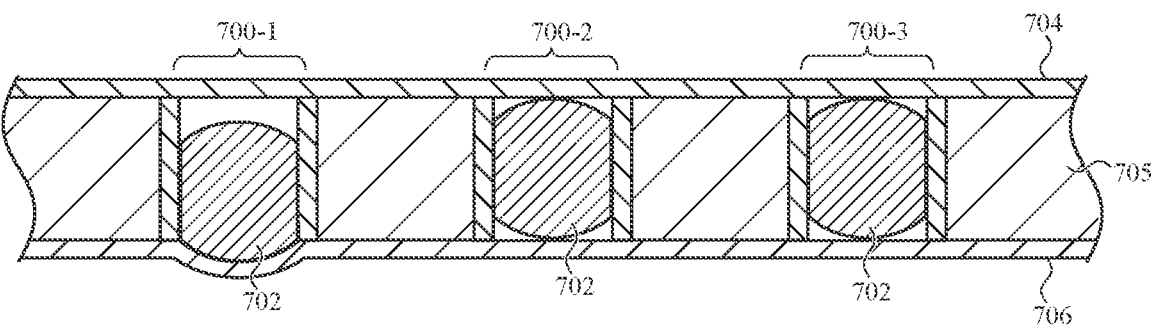

FIGS. 7A-7C are cross-sections of an embodiment of the first strap 106 viewed along line 6-6 in FIG. 5. In this embodiment, the actuators are electromechanical actuators 700 that include movable pins 702 that are configured to selectively press against a first layer 704 and/or a second layer 706 in order to form protrusions along the surfaces of the first strap 106 defined by those layers. The first and second layers 704, 706 may be formed from or include flexible material (e.g., silicone, TPU), and may be glued or otherwise bonded to a middle layer 705 such that they cover the actuators 112 (e.g., they are disposed over and/or under the actuators 112).

The electromechanical actuators 700 may include electrical coils (not shown) that, when energized, cause the movable pins 702 to extend relative to a sleeve 701 and press against the first and/or second layer 704, 706. For example, an electrical current may be passed through the coils (via the electrodes 500, FIG. 5) to produce an electromagnetic field. The electromagnetic field may apply a force to the movable pins 702 that drives the movable pins 702 against the first layer 704 or the second layer 706, thus locally deforming the layer and forming a protrusion on a surface of the first strap 106. When the electromagnetic field is removed, the movable pins 702 retract to a neutral position between the layers 704, 706.

FIG. 7B shows the first strap 106 of FIG. 7A where the movable pin 702 of a first electromechanical actuator 700-1 has been forced against the first layer 704, thus deforming an area of the first layer 704 above the electromechanical actuator 700-1. The deformed area may correspond to a dot of a braille character being presented on a surface of the band 104, as described above.

FIG. 7C shows the first strap 106 of FIG. 7A where the movable pin 702 of the electromechanical actuator 700-1 has been forced against the second layer 706, thus deforming an area of the second layer 706 below the electromechanical actuator 700-1. The deformed area may correspond to a dot of a braille character being presented on a surface of the band 104, as described above, or it may be used to provide tactile or haptic feedback to a user, such as by pressing against a user's wrist or another body part to which the band 104 is coupled.

The first and second layers 704, 706 may provide a centering force that returns the movable pins 702 to a neutral position when the electromechanical actuators 700 are deactuated (e.g., such that the layers 704, 706 are not deformed and no protrusion is formed). In particular, once the coil of an electromechanical actuator 700 is de-energized, the force of the first and/or second layer 704, 706 trying to return to its undeformed state may force the movable pin 702 into a neutral position between the first and second layers 704, 706 where it is not deforming either layer.

Figure 8A:
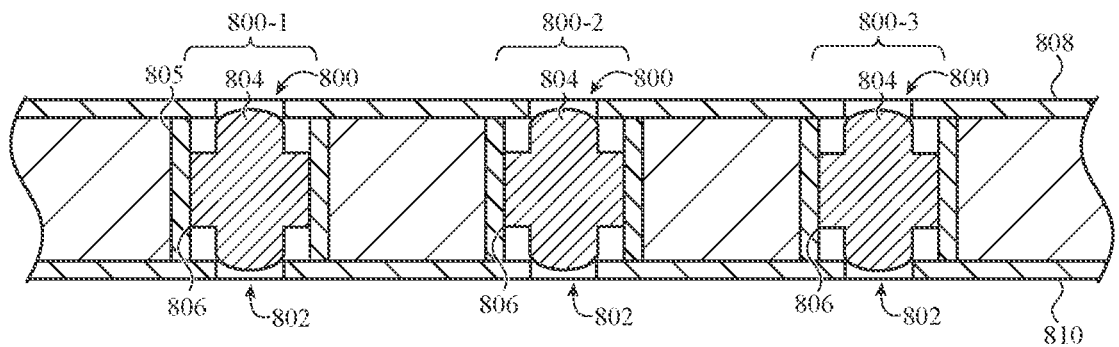
FIGS. 8A-8C are partial cross-sectional views of the band of FIG. 5 with electromechanical actuators, taken along line 6-6 in FIG. 5.
Figure 8B:
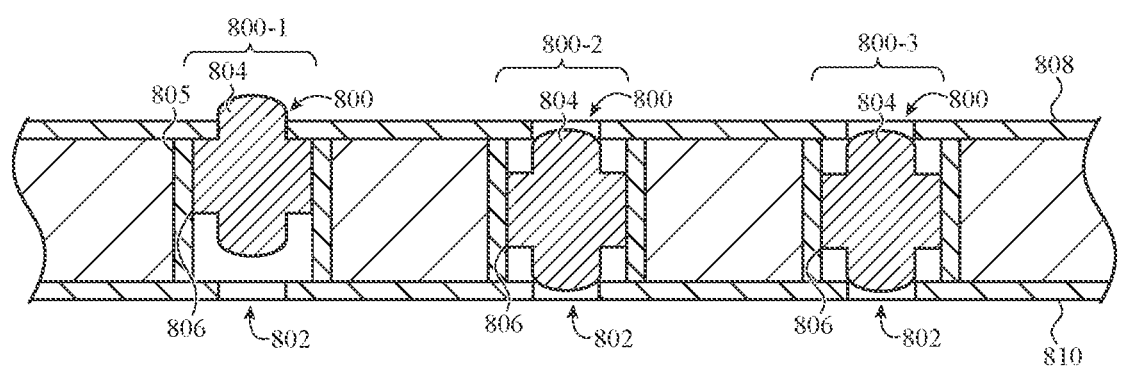
Figure 8C:
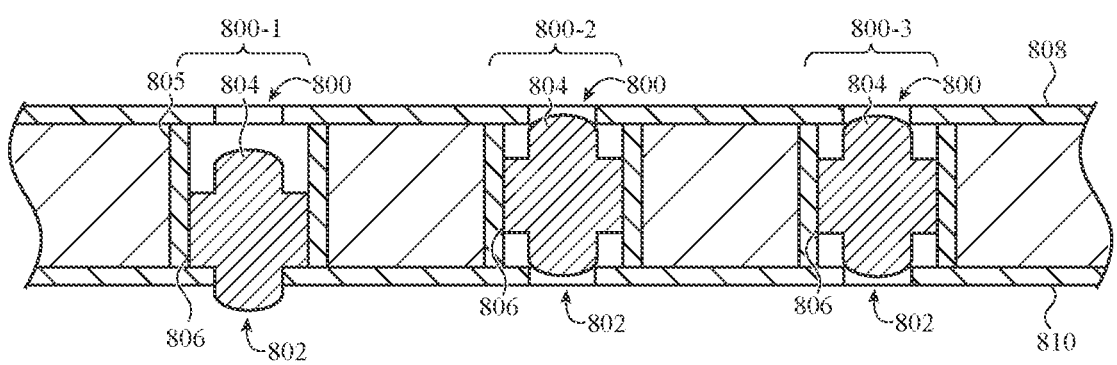

FIGS. 8A-8C are cross-sections of an embodiment of the first strap 106 viewed along line 6-6 in FIG. 5. In this embodiment, the actuators are electromechanical actuators 801 that include movable pins 804 that are configured to extend at least partially through openings 800 in a first layer 808 of the first strap 106 and/or optional openings 802 in a second layer 810 of the first strap 106.

The electromechanical actuators 801 may include electrical coils (not shown) that surround at least a portion of the movable pins 804 and cause the movable pins 804 to move within a sleeve 805 and extend at least partially through the first or second openings 800, 802. For example, an electrical current may be passed through the coils (via the electrodes 500, FIG. 5) to produce an electromagnetic field. The electromagnetic field may apply a force to the movable pins 804 that drives the movable pins 804 in one or the other direction.

The movable pins 804 may include flanges 806 that extend from a main body of the movable pins 804 and engage with the first and/or the second layer 808, 810 in order to retain the movable pins 804 in the first strap 106. For example, FIG. 8B shows the first strap 106 of FIG. 8A where the movable pin 804 of a first electromechanical actuator 801-1 is extended partially through an opening 800 in the first layer 808. (The extended portion of the pin 804 area may correspond to a dot of a braille character being presented on a surface of the band 104, as described above.) The flange 806 of the first electromechanical actuator 801-1 engages with (e.g., contacts) a portion of the first layer 808 that overhangs the sleeve 805, thus retaining the movable pin 804 of the first electromechanical actuator 801-1 in the sleeve. Similarly, FIG. 8C shows the first strap 106 of FIG. 8A where the movable pin 804 of a first electromechanical actuator 801-1 is extended partially through an opening 802 in the second layer 810.

The particular location, size, or shape of the flange (as well as the thickness of the strap 106, the first layer 808, or the second layer 810) may be selected based on the length that the movable pins 804 are to extend beyond the first or second layers 808, 810 of the first strap 106. For example, the flange and layers may be configured such that when the electromechanical actuators 801 are actuated, the movable pins 804 extend 0.25 mm, 0.5 mm, 0.75 mm, 1 mm, or any other appropriate distance.

The flange and the layers may also be configured such that the movable pins 804 extend beyond the first and second layers 808, 810 by a different distance. For example, protrusions along the first layer 808, which may correspond to an outer surface of the first strap 106, may be primarily intended for use as a dot in a braille character. Because braille characters are intended to be felt by highly sensitive fingertips, the protrusion may be relatively small (e.g., 0.25 mm, 0.5 mm.). On the other hand, protrusions (or other tactile output mechanisms) along the second layer 810, which may correspond to an inner surface of the first strap 106, may be primarily intended to provide a tactile output to a less sensitive body part, such as a user's wrist, and so larger protrusions may be used (e.g., 0.75 mm, 1 mm.). In implementations where asymmetrical protrusions sizes are used, the centers of the flanges 806 may be offset from the centers of the movable pins 804. For example, the flanges 806 may be closer to the first layer 808 than the second layer 810, such that the movable pins 804 can extend beyond the first layer 808 a smaller distance than they can extend beyond the second layer 810.

In some cases, the first strap 106 may have openings in only one of the layers. Moreover, some actuators may be adjacent openings in only the first layer 808, while others are adjacent openings in only the second layer 810. For example, some actuators may be dedicated to forming protrusions along only one surface of the first strap 106.

The first strap 106 in FIGS. 8A-8C may also include one or more additional layers over the first and second layers 808, 810 to cover and/or seal the openings 800, 802. For example, a layer of silicone or other appropriate material may be placed over the first and second layers 808, 810, and the movable pins 804 may press against and deform the additional layers to form protrusions on the inner and/or outer surface of the first strap 106 (similar to the configuration shown and described with respect to FIGS. 7A-7C).

Where the band 104 includes layers that cover the actuators 112, the layers may be configured so that protrusions formed in the layers are a different color than surrounding areas. The contrasting colors of the protrusions and the adjacent portions of the band 104 will make the existence of the protrusions more visible, which may be helpful for individuals who are visually impaired but not completely blind, or in cases where the band is being used to convey information visually to sighted users (e.g., when the protrusions are presenting images of characters or are acting as a progress indicator).

A color changing effect may be achieved by selecting a layer material, thickness, and/or pigment so that areas of the layer that are deformed to form the protrusion appear to be a different color. For example, a layer formed from a red material and having an appropriate thickness may turn pink or even white when it is deformed by an actuator 112. Also, a thinner material may exhibit a greater change in color than a relatively thicker material for a given deformation. Accordingly, the layers that cover the actuators 112 may be thinner above the actuators than in other areas.

In embodiments where the actuators are electrothermal actuators, a color changing effect may be achieved by including thermochromic materials in the layers that form the outer surfaces of the band 104. The thermochromic materials may be configured to be one color when at a first temperature and a different color when at a second temperature. The first temperature may correspond to a typical temperature of the band 104 during normal use of the device (and when the electrothermal actuators are not actuated), taking into consideration factors such as the body heat of a user, possible incident sunlight, and the like. The second temperature may correspond to a temperature that the area corresponding to the protrusion will likely reach when the actuation material 602 is heated by an electrothermal actuator. Thus, when an electrothermal actuator heats the actuation material 602, the area of the layer that is proximate the electrothermal actuators may change to a color that is different than other areas of the layer. Thermochromic materials may be included in discrete regions of the layers corresponding to the locations of the actuators such that the color border between the protrusions and the surrounding areas is more distinct.

Figure 9:
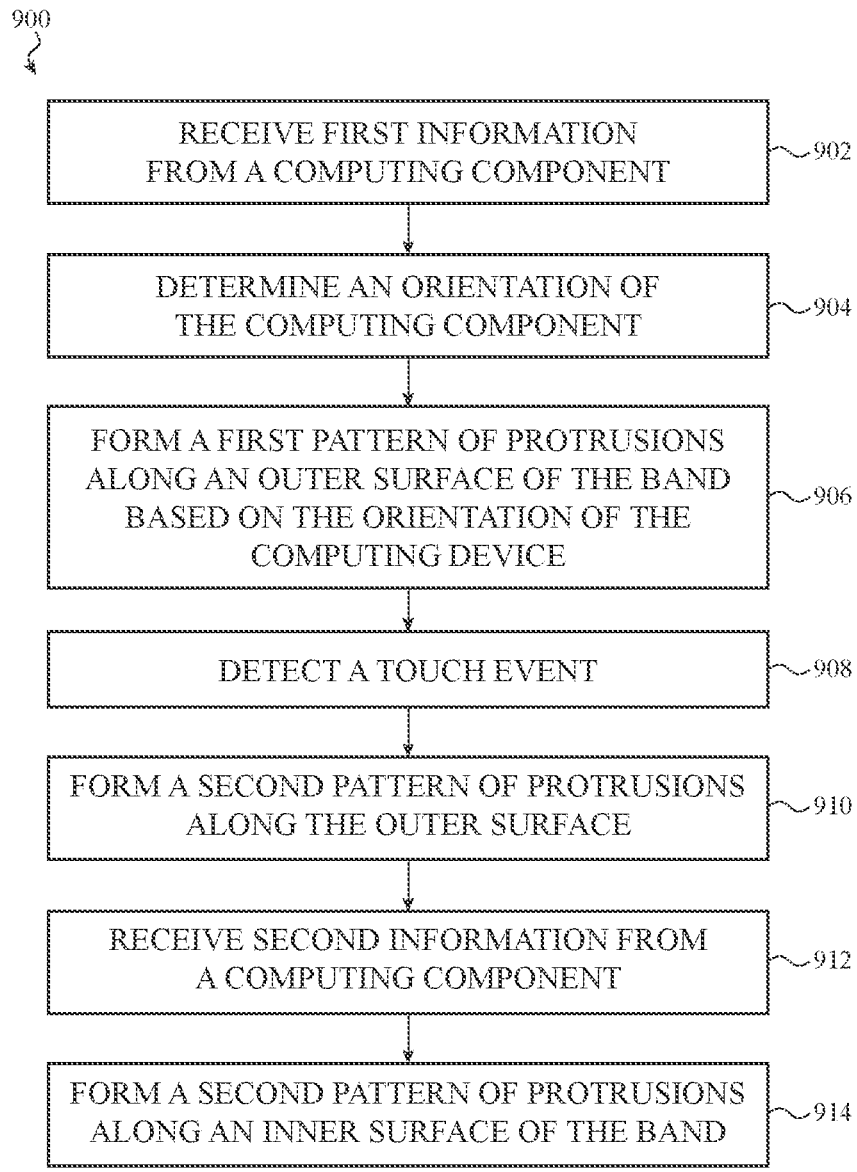
FIG. 9 is a flow chart of a method of providing tactile output on a strap of a wearable electronic device.

FIG. 9 is a flow chart of a sample method 900 for providing tactile output via one or more tactile output mechanisms associated with, or incorporated into, a wearable item. The wearable electronic item may be associated with any appropriate wearable electronic device, such as the wearable electronic device 100 described herein. In some embodiments, the wearable item is a band, lanyard, belt, strap, connector or the like. In other embodiments, the wearable item may be a piece of clothing, an accessory (like a ring or glasses), shoes, gloves, and so on.

At operation 902, first information from a computing component (e.g., the computing component 101, FIG. 1) of an electronic device is received at a wearable item comprising actuators configured to selectively form protrusions along an inner and an outer surface of the band. The wearable item may correspond to the band 104, described herein, and references to a "band" embrace any suitable wearable item. The first information may be any appropriate information, including a time of day, a status of a task (e.g., a download, a physical activity goal, a timer, or the like), rendered text (e.g., from emails, text messages, webpages, e-books, and the like), or transcribed speech (e.g., incoming speech from a voice call or voicemail). In some embodiments, the computing component need not by physically connected to the band.

At operation 904, an orientation of the computing component is determined using an orientation detector of the computing component (e.g., an accelerometer). It should be appreciated that this operation is optional and may be omitted.

At operation 906, a set of the actuators are caused to form a first pattern of protrusions along the outer surface of the band, where the first pattern corresponds to a character indicated by the first information. The first pattern of protrusions may comprise a braille pattern corresponding to the first information. For example, if the first information is a time of day, the braille pattern may be one or more braille digits corresponding to digits of the time of day.

As noted above, a band (e.g., the band 104) may be able to present braille characters in more than one orientation. Thus, when the set of actuators are caused to form a braille character at operation 906, the orientation of the braille character optionally may be determined based on the orientation of the computing component as determined at operation 904. In accordance with a determination that the orientation is a first orientation (e.g., corresponding to an orientation indicative of the user reading in a top-to-bottom direction), the braille representation may be formed with a bottom of the braille representation perpendicular to a longitudinal axis of the band, as described with reference to FIG. 3A. In accordance with a determination that the orientation is a second orientation (e.g., corresponding to an orientation indicative of the user reading in a left-to-right direction), the braille representation may be formed with the bottom of the braille representation parallel to a longitudinal axis of the band, as described with reference to FIG. 3B.

At operation 908, a touch event is detected on a touch sensitive component proximate the first pattern of tactile output mechanisms (here, protrusions). For example, the band 104 may detect that a finger has contacted a touch sensitive region (e.g., a touch sensitive region 302, 304, FIGS. 3A-3B), indicating that a user has touched and therefore read the character formed by the first pattern.

At operation 910, in response to detecting the touch event, the set of the actuators is caused to form a second pattern of protrusions corresponding to the first information along the outer surface. For example, the second pattern may correspond to a second character (or a second set of characters) indicated by the first information received at operation 902.

At operation 912, second information from the computing component of the electronic device (e.g., the computing component 101) is received at the band. The second information may be any appropriate information, and may be different (or a different type of information) than the first information. For example, the first information may correspond to or otherwise cause the presentation of braille characters, and the second information may correspond to a status indicator.

At operation 914, in response to receiving the second information, a second set of the actuators are caused to form a second pattern of protrusions along the inner surface of the band. The second pattern may correspond to a shape, such as a line, square, circle, or rectangle of protrusions, and the pattern may be configured to change with time. For example, as described above, the pattern may be a single instance of all of the actuators along the inner surface of the band forming protrusions in order to notify the user of an event. The pattern may also or instead be a temporal pattern of pulses, such as a number of pulses of the actuators corresponding to an hour or minute of the current time of day. A "temporal pattern" may vary with time.

While the foregoing discussion describes actuators that form protrusions on a band 104, other types of actuators and/or tactile responses may be used. For example, thermal actuators (or other components) may be used to generate tactile symbols using regions of hot and/or cold along surfaces of a band 104. The hot and cold regions may be used in the same or similar manner as the protrusions; that is, they may also function as tactile output mechanisms. For example, small regions of relative heat and/or cold may be used to form braille characters (or any other appropriate character) that a user can sense by touching with a finger. As another example, regions of heat and/or cold may be produced along an inner surface of the band to convey time, notify the user of certain events, indicate progress of a task or event, or for any other appropriate function. As yet another example, actuators of the band (or other wearable item) may form depressions rather than protrusions. Accordingly, depressions are yet another example of tactile output mechanisms.

While any methods disclosed herein have been described and shown with reference to particular operations performed in a particular order, these operations may be combined, sub-divided, or re-ordered to form equivalent methods without departing from the teachings of the present disclosure. Accordingly, unless specifically indicated herein, the order and grouping of the operations is not a limitation of the present disclosure.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A watch, comprising:
    a computing component comprising:
        a housing;
        a display device;
        a processing unit; and
        a first data connector; and
    a band comprising:
        an attachment member that is removably securable to the housing;
        a second data connector configured to operably connect to the first data connector when the attachment member is secured to the housing;
        a flexible strap extending from the attachment member;
        actuators within the flexible strap and configured to dynamically form protrusions along the flexible strap; wherein the protrusions present tactilely-perceptible information based on a signal transmitted from the processing unit of the computing component and through the first data connector and the second data connector;
        a first touch sensitive region positioned between adjacent pairs of the actuators, configured to detect contact at the first touch sensitive region by a finger of a user, and operatively coupled to the processing unit; and
        a second touch sensitive region positioned between one of the actuators and an edge of the flexible strap, configured to detect contact at the second touch sensitive region by the finger of the user, and operatively coupled to the processing unit;
    wherein the processing unit is configured to:
        receive information from the first touch sensitive region and the second touch sensitive region;
        determine, based on the information, whether the finger of the user is in a first orientation or a second orientation relative to the band; and
        causing the actuators to form a pattern of deformations based on whether the finger of the user is in the first orientation or the second orientation.

2. The watch of claim 1, wherein the computing component further comprises:
    an audio output device;
    a touch-sensitive surface;
    a biometric sensor; and
    an orientation detector.

3. The watch of claim 2, wherein the actuators comprise movable pins configured to extend and retract to dynamically form the protrusions;
    the flexible strap defines openings therein; and
    the movable pins extend at least partially through respective openings when extended, thereby forming the protrusions.

4. The watch of claim 3, further comprising a layer covering the actuators; wherein the movable pins locally deform the layer when the movable pins are extended.

5. The watch of claim 1, wherein the actuators comprise:
    an actuation material having a first density when in a solid phase and a second density, lower than the first density, when in a liquid phase; and
    a heating element configured to selectively change phase of the actuation material.

6. The watch of claim 5, wherein the actuators comprise movable pins configured to extend and retract to dynamically form the protrusions.

7. A wearable electronic device, comprising:
    a computing component; and
    a band coupled to the computing component, and comprising:
        an inner surface for contacting a wearer;
        an outer surface opposite the inner surface; and
        actuators, each of the actuators being configured to dynamically form tactile symbols along both the inner surface and outer surface.

8. The wearable electronic device of claim 7, wherein:
    the actuators are first tactile output mechanisms;
    the tactile symbols are first tactile symbols; and the wearable electronic device further comprises second actuators configured to selectively form second tactile symbols along the inner surface.

9. The wearable electronic device of claim 7, wherein each of the actuators comprises a pin movable between:
   a neutral position in which no tactile output is formed;
   a first position in which tactile outputs are formed along the inner surface; and
   a second position in which tactile outputs are formed along the outer surface.

10. The wearable electronic device of claim 7, wherein the band further comprises:
   a first layer defining the outer surface; and
   a second layer defining the inner surface; wherein the actuators are positioned between the first layer and the second layer and are configured to deform the first layer and the second layer to form the tactile symbols.

11. A method for providing tactile output via a band of a wearable electronic device, comprising:
   receiving, at a band including actuators configured to selectively form deformations along a surface of the band, information from a computing component coupled to the band;
   determining whether the computing component is in a first computing component orientation or a computing component second orientation; and
   in response to receiving the information, causing a set of the actuators to form a pattern of deformations along the surface, the pattern being formed in a first pattern orientation relative to the band when the computing component is in the first computing component orientation or in a second pattern orientation relative to the band when the computing component is in the second computing component orientation.

12. The method of claim 11, wherein the pattern comprises a braille pattern.

13. The method of claim 12, wherein:
   receiving the information comprises receiving information corresponding to a time; and
   the braille pattern comprises a braille representation of a digit of the time.

14. The method of claim 13, further comprising determining an orientation of the computing component; wherein forming the braille pattern comprises forming the braille representation of the digit based, at least in part, on the orientation of the computing component.

15. The method of claim 11, wherein:
   the pattern of deformations is a first pattern of deformations; and
   the method further comprises:
   detecting a touch on a touch sensitive component proximate the first pattern of deformations; and
   in response to detecting the touch, causing the set of the actuators to form a second pattern of deformations corresponding to the information along the surface.

16. The method of claim 11, wherein:
   the surface is an outer surface of the band;
   the set of the actuators is a first set of the actuators;
   the pattern of deformations is a first pattern of deformations; and
   the method further comprises:
   receiving, at the band, additional information from the computing component; and
   in response to receiving the additional information, causing a second set of the actuators to form a second pattern of deformations along an inner surface.

17. The method of claim 11, wherein the pattern is a temporal pattern.

* * * * *